(12) United States Patent
Dunstan et al.

(10) Patent No.: US 6,657,724 B1
(45) Date of Patent: Dec. 2, 2003

(54) OPTICAL FILTER FOR RAMAN SPECTROSCOPY

(75) Inventors: David J Dunstan, London (GB); Mark D Frogley, London (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 09/530,265

(22) PCT Filed: Sep. 2, 1999

(86) PCT No.: PCT/CH99/02890
§ 371 (c)(1),
(2), (4) Date: May 16, 2000

(87) PCT Pub. No.: WO00/14578
PCT Pub. Date: Mar. 16, 2000

(30) Foreign Application Priority Data

Sep. 2, 1998 (GB) ............................................. 9819006

(51) Int. Cl.[7] .................................................. G01J 3/12
(52) U.S. Cl. ...................................................... 356/333
(58) Field of Search ................................ 356/333, 326, 356/369; 250/339.07, 339.09

(56) References Cited

U.S. PATENT DOCUMENTS

| 3,656,232 | A | * | 4/1972 | Hinchey ...................... 29/833 |
| 3,865,490 | A | * | 2/1975 | Grossman ................... 356/301 |
| 4,235,518 | A | | 11/1980 | Greiner |
| 4,497,540 | A | | 2/1985 | Breckinridge et al. |
| 4,553,840 | A | * | 11/1985 | Nogami et al. ............. 356/333 |
| 4,820,046 | A | * | 4/1989 | Sohma et al. ................ 356/328 |
| 4,896,332 | A | | 1/1990 | Wisotzki |
| 5,285,254 | A | * | 2/1994 | De Sa ......................... 356/308 |
| 5,424,825 | A | | 6/1995 | Delhaye et al. |
| 5,439,723 | A | * | 8/1995 | Miyashita et al. ......... 428/66.7 |
| 5,661,557 | A | * | 8/1997 | Da Silva et al. ............ 356/301 |

FOREIGN PATENT DOCUMENTS

| EP | A1 0 543 578 | | 5/1993 |
| JP | 61-167851 | * | 7/1986 |

OTHER PUBLICATIONS

Wright, *A Photoelectric Spectrophotometer and Tristimulus Colorimeter designed for Teaching and Research*, pp. 103–107.

* cited by examiner

Primary Examiner—Zandra V. Smith
Assistant Examiner—Gordon J Stock, Jr.
(74) Attorney, Agent, or Firm—Oliff & Berridge, PLC

(57) ABSTRACT

An optical filter is provided in the form of a subtractive double monochromator. In each dispersive stage, a concave mirror focuses light between a diffraction grating and a transfer mirror between the stages. Light which misses the transfer mirror is rejected. To reduce aberrations over a wide bandwidth, the radius of curvature R of the mirror is centered on the grating and the transfer mirror has a radius of curvature R/2 and is located midway between the mirror and the grating. The mirror 34 thus coincides with the locus of the focus of the spectral image in both stages.

20 Claims, 3 Drawing Sheets

OPTICAL FILTER FOR RAMAN SPECTROSCOPY

Figure 1:
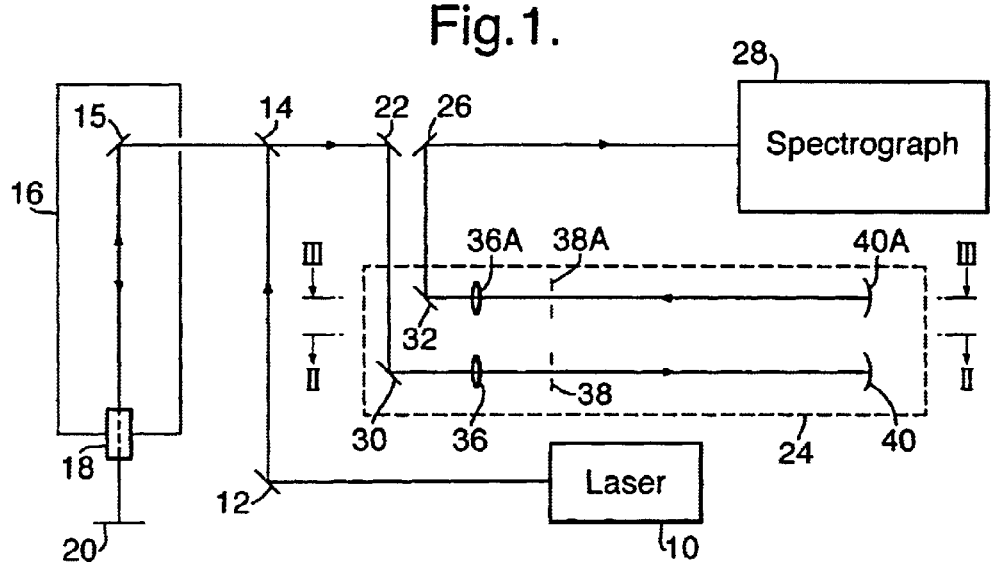

This invention relates to an optical filter. It may be used, for example, in spectroscopic applications, such as Raman spectroscopy.

In Raman spectroscopy, a sample is illuminated with monochromatic light, e.g. from a laser. The resulting scattered light is analysed spectroscopically. Most of the scattered light is Rayleigh scattered, at the same wavelength as the exciting laser beam. However, a minor proportion is scattered at Raman-shifted wavelengths as a result of interactions with molecules making up the sample. Different molecular species have different characteristic spectra of such Raman-shifted light, and so this Raman effect can be used to analyse the molecular species present.

In order to analyse the Raman spectrum, it is first necessary to remove the much stronger Rayleigh scattered light, which would otherwise completely swamp the Raman scattered light.

A known Raman spectroscopic apparatus is described in European Patent Application No. EP-A-543578 (Renishaw). This uses a holographic notch or edge filter to reject the Rayleigh scattering, while transmitting the Raman scattering. With the arrangement described, it is possible to detect Raman scattered light with wavenumbers as low as 50 cm from the Rayleigh line. However, detecting Raman scattered light closer to the Rayleigh line than about 50 cm would require a filter with a steeper transition in its transmission characteristic, between a high optical density at the laser wavelength and a low optical density at the Raman wavelengths which are to be transmitted.

Traditionally, double and triple monochromators have been used in order to separate very low Raman wavenumbers from the Rayleigh scattered light at the laser wavelength. A conventional double monochromator comprises two dispersive stages, each comprising a dispersive element (usually a diffraction grating). An entrance slit is provided before the first dispersive stage, and an intermediate or transfer slit between the two stages. A spectrum dispersed by the first stage is focused in the plane of the intermediate or transfer slit, which transmits just one monochromatic wavenumber from the spectrum into the second dispersive stage. The wavenumber thus transmitted can be tuned by moving the slit in the plane of the focused spectrum, or more normally by rotating the grating or other dispersive element. The second dispersive stage may be "subtractive", i.e. it may reverse the dispersion in the first stage.

A disadvantage of a monochromator filter of this type is that only one Raman wavenumber is transmitted at a time. Analysing a full Raman spectrum requires that the filter should scan the spectrum, which is time consuming.

It would of course be possible to use a wider intermediate or transfer slit, passing a range of Raman wavenumbers. See for example U.S. Pat. No. 5,424,825 (assigned to Dilor). Here, there is a relatively wide aperture in the plane of the focused dispersed spectrum, passing a wider band of wavenumbers to the second dispersive stage (which is said to be subtractive and which therefore re-forms a polychromatic beam). A narrow light trap is provided within the aperture, to block a narrow band around the Rayleigh scattered line. U.S. Pat. No. 5,424,825 also suggests an inverse arrangement, having a plane mirror in place of this relatively wide transfer aperture. The width of this transfer mirror corresponds to the width of the aperture, and all Raman wavenumbers falling on the mirror within this range of wavenumbers are reflected towards the second dispersive stage. A narrow slit in the transfer mirror allows a narrow waveband around the Rayleigh scattered line to pass through the mirror, without being reflected into the second dispersive stage; this corresponds to the narrow light trap in the transfer aperture.

A somewhat similar filter having a transfer mirror of a defined width (but not for Raman spectroscopy) is described by W D Wright, Optica Acta, 1, 102–107 (September 1954). In this paper, the first dispersive stage takes the form of the upper parts of two glass prisms, in series. The resulting dispersed spectrum from these is focused onto a strip of spherical mirror. The radius of curvature of the mirror is chosen so as to return the spectrum back through the lower parts of the prisms, which thus form the second, subtractive dispersive stage. By choosing an appropriate width for the strip of spherical mirror, the spectral bandwidth to be returned through the second dispersive stage can be arbitrarily selected.

U.S. Pat. No. 3,865,490 (Grossman) shows another such arrangement with a transfer mirror, intended for Raman spectroscopy and using a diffraction grating instead of prisms. The transfer mirror has a narrow slit which removes the Rayleigh line. Once again, the mirror has a radius of curvature chosen to ensure that the reflected rays are correctly directed towards the second, subtractive dispersive stage.

Reference has been made above to the plane into which the dispersed spectrum is focused. However, in general the locus of the focused spectrum does not lie in a single plane. Rather, this locus is curved. Moreover, the curve does not in general coincide with the curvature required of the mirrors in the Wright paper and the Grossman patent, in order to direct the rays towards the second dispersive stage.

This curvature of the locus of the focused spectrum does not give rise to a problem in a conventional monochromator having only a narrow transfer slit. In such a case, it is easy to arrange that the slit coincides with the focused spectrum. However, where an aperture or mirror of a substantial width is used, the focus does not coincide with the aperture or mirror over its full width. This results in significant aberrations, especially where a wide bandwidth is desired.

Of the above prior art documents, only the Grossman patent recognises this problem and proposes a solution. However, this solution involves a mirror made up of numerous segments. The faces of each segment are ground with the radius of curvature required in order to return the rays correctly into the second dispersive stage. They are then displaced into a stepped or echelle arrangement, corresponding to the locus of the spectral image. Such an arrangement is complicated to manufacture and set up, and a different stepped or echelle mirror configuration is required if the filter is to be re-tuned to reject a different laser wavelength.

A further problem with the above prior proposals relates to the steepness of the transition in optical density, between a high optical density at the wavelength(s) which are to be rejected, and a low optical density at the wavelengths which are to be transmitted. In the case of Raman spectroscopy, this steepness governs how close to the laser line the Raman spectrum can be discriminated, i.e. whether very low Raman wavenumbers can be detected. Imperfections in the edge of the transfer aperture or mirror mean that a steep transition can only be obtained by using very high dispersion. However, in these prior proposals, the transfer aperture or mirror can only be a finite size (in order to minimise aberrations). The result of such high dispersion over a transfer aperture or mirror of finite size is that the filter can have only a relatively narrow bandwidth (only a narrow band of wavelengths can be passed to the second dispersive stage).

In one aspect, the present invention provides an optical filter comprising:
- a first dispersive stage,
- a second, dispersive stage,
- a transfer mirror or aperture between the first and second dispersive stages,
- each dispersive stage comprising a dispersing element and focusing means, having a predetermined focal locus for dispersed light,
- light from the dispersing element in the first dispersive stage being focused by the focusing means of the first dispersive stage to produce a spectral image in the focal locus of the first dispersive stage,
- the transfer mirror or aperture being located in said focal locus, light of said spectral image which falls upon the transfer mirror or aperture being accepted and passed to the second dispersive stage, and light of said spectral image which does not fall upon the transfer mirror or aperture being rejected,
- light from a spectral image in the predetermined focal locus of the second dispersive stage being recombined subtractively by the focusing means and dispersing element thereof into a polychromatic beam,
- wherein the predetermined focal loci of the first and second stages are coincident, the transfer mirror or aperture being located in said coincident loci.

Preferably the dispersing elements of the first and second stages are imaged upon one another. A field optic (e.g. a lens or a non-planar mirror) between the two dispersive stages may co-operate with the focusing means of the two stages to achieve this. The dispersing elements are preferably diffraction gratings.

We presently prefer that the focusing means in each dispersive stage should be concave mirrors. However, a focusing lens may be used instead; or a concave diffraction grating may provide both the dispersing element and the focusing means.

In a second aspect, the present invention provides an optical filter comprising:
- a first dispersive stage,
- a second dispersive stage,
- a transfer mirror or aperture between the first and second dispersive stages,
- each dispersive stage comprising a dispersing element (such as a diffraction grating) and a concave mirror, light from the dispersing element in the first dispersive stage being focused by the concave mirror of the first dispersive stage, producing a spectral image in a predetermined locus, the transfer mirror or aperture being located in said locus, light of said spectral image which falls upon the transfer mirror or aperture being accepted and light of said spectral image which does not fall upon the transfer mirror or aperture being rejected,
- the concave mirror of the second dispersive stage receiving the light which is accepted by the transfer mirror or aperture and passing it to the dispersing element of the second dispersive stage,
- characterised in that the concave focusing mirror in at least one of said dispersive stages has a radius of curvature which is centred on the dispersing element of that dispersive stage.

It is then possible for the transfer mirror or aperture to be located in a manner which both correctly transfers the light from the first dispersive stage to the second dispersive stage, and also coincides with the locus of the focus of the spectral image. In the case of a transfer mirror, it may suitably be convex in order to achieve this. Preferably, the concave focusing mirror of both said dispersive stages has a radius of curvature which is centred on the dispersing element of the respective dispersive stage.

Figure 2:
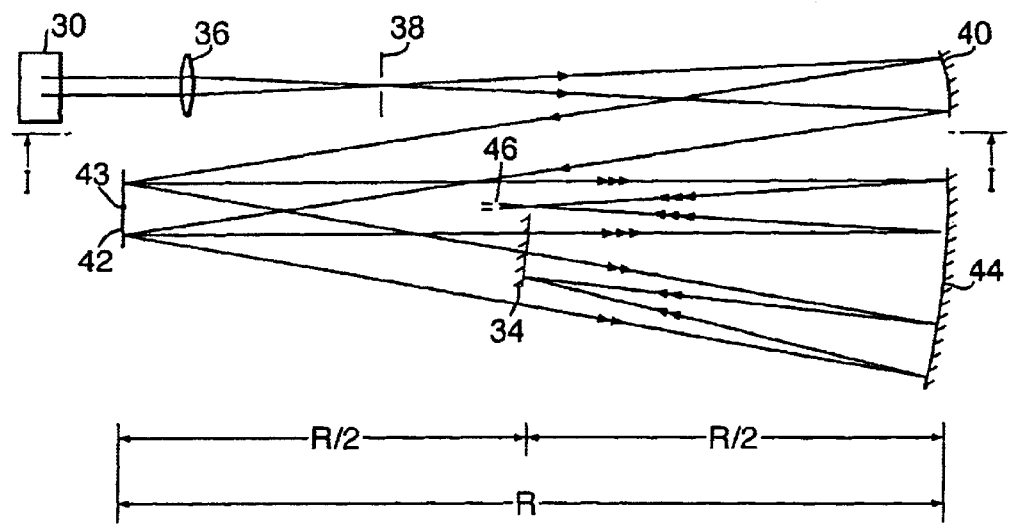
Figure 3:
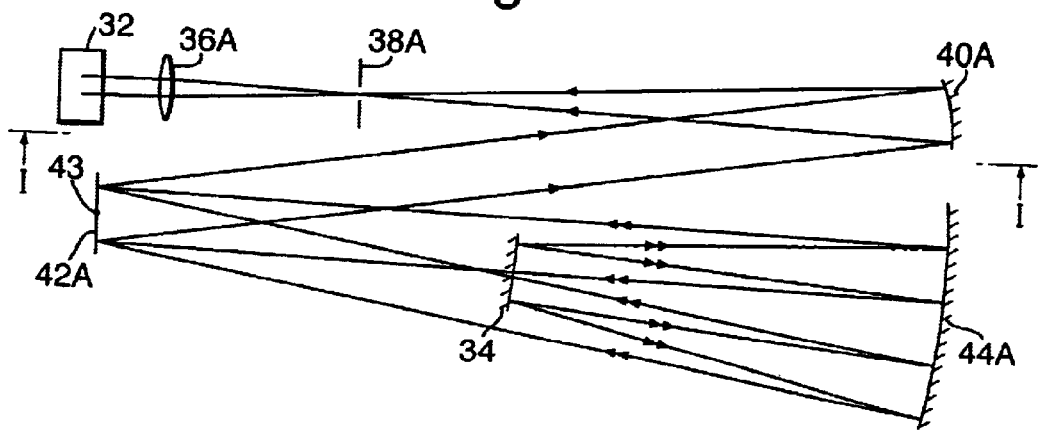
Figure 4:
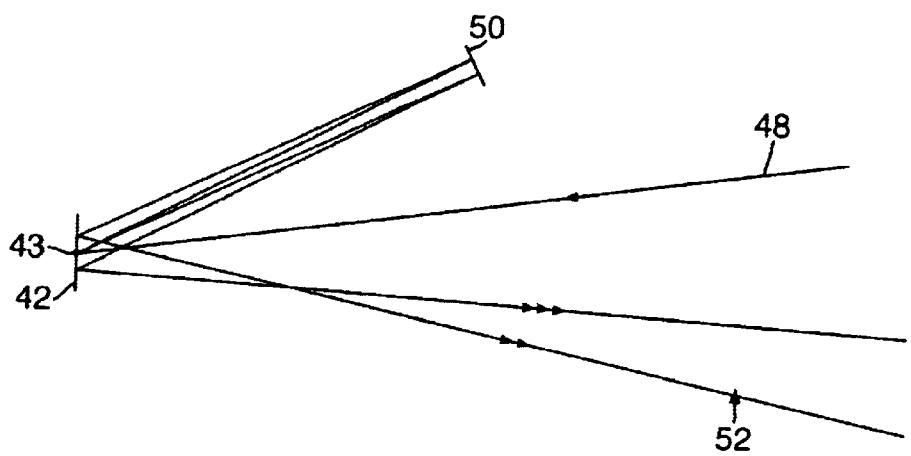
Figure 5:
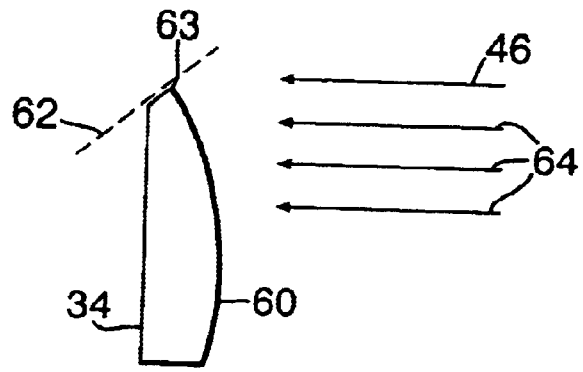

Preferred embodiments of the present invention will now be described by way of example, with reference to the accompanying drawings, wherein:

FIG. 1 is a schematic diagram of a Raman microscope, incorporating a preferred embodiment of optical filter, FIG. 2 is a view of the optical filter, taken on the line II—II in FIG. 1 (the FIG. 1 view of the optical filter being denoted by the line I—I in FIG. 2), FIG. 3 is a view of the optical filter taken on the line III—III in FIG. 1 (the view of FIG. 1 again being denoted by the line I—I), FIG. 4 shows part of a modification of the FIG. 2 arrangement, FIG. 5 illustrates one method of making a mirror for use in the apparatus of FIGS. 1 to 4, and FIGS. 6, 7 and 8 illustrate steps in an alternative method for making a mirror for such use.

Referring firstly to FIG. 1, the Raman microscope is based upon that shown in our European Patent Application No. EP 543578, to which reference should be made for further details. Briefly, a laser 10 provides an input laser beam, which is reflected by a mirror 12 and a beamsplitter 14 towards a microscope 16. Here, it is reflected by a mirror 15, and an objective lens 18 of the microscope focuses it to illuminate a spot (preferably a diffraction limited spot) on a sample 20. This results in both Rayleigh and Raman scattered light, which is collected by the objective 18 and passes back via the mirror 15 and the beamsplitter 14.

EP 543578 describes a dichroic filter, e.g. a holographic filter, at the position corresponding to the beamsplitter 14, for the purpose of rejecting the Rayleigh scattered light from the Raman scattered light as well as directing the illuminating laser beam towards the sample. However, in the present embodiment the beamsplitter 14 is a conventional neutral density type. Rather than a 50/50 beamsplitter, it may be preferable to use an 80/20 or 90/10 beamsplitter. This results in 80% or 90% of the desired Raman scattered light being transmitted from the sample towards the remainder of the apparatus, described below.

The mixture of Rayleigh and Raman scattered light passing through the beamsplitter 14 is deflected by a mirror 22 towards an optical filter 24, described in more detail below. This rejects the Rayleigh scattered light and passes the Raman scattered light via a further mirror 26 to a spectrograph 28. The spectrograph 28 may be as described in EP 543578, comprising a diffraction grating on a rotatable stage, which disperses the Raman spectrum across a suitable detector such as a charge-coupled device (CCD). However, of course, other spectrograph arrangements could be used, or different spectroscopic apparatus such as a scanning spectrometer.

The optical filter 24, in the preferred embodiment, is designed to fit in the same housing as the Raman system shown in EP 543578, in place of various filtering components described in that application intended for viewing a two-dimensional image of the sample in light of the selected Raman wavenumber. For this reason, the optical filter 24 has been designed to be compact, to receive its input via the mirror 22 and a further mirror 30, and to direct its output towards the spectrograph 28 via mirrors 32 and 26. However, of course, none of these features is essential.

The input to the optical filter 24 from the mirror 22 is directed by the mirror 30 onto a lower level, which is shown in FIG. 2. The output is taken via the mirror 32 towards the mirror 26 and the spectrograph 28, from an upper level of the optical filter 24, which is shown in FIG. 3. The components in the lower level and the upper level are generally similar, since a symmetrical design is preferred. Light is transferred from the lower level to the upper level via a transfer mirror 34, located between the two levels, and which can be seen in both FIG. 2 and FIG. 3.

The lower, input level of the filter 24 will now be described, referring to FIGS. 1 and 2. The input Raman and Rayleigh scattered light is focused by a lens 36 onto an entrance slit 38. It is then collimated by a concave mirror 40, which may suitably be a paraboloid, though this is not essential. The components 36,38,40 provide spatial filtering and beam expansion, but could be omitted if desired. The mirror 40 is arranged off-axis by a couple of degrees, so as to direct the collimated light out of the plane of FIG. 1, towards a reflective diffraction grating 42 as seen in FIG. 2. The grating 42 is rotatable about an axis 43, for tuning purposes.

The grating 42 produces a dispersed spectrum, which is directed towards a concave mirror 44, which focuses it. The mirror 44 could be a section of a spherical mirror, or it could be an aspheric toroidal mirror or even a cylindrical mirror. It has a radius of curvature which is centred on the grating 42, and more specifically on its central axis 43.

The positioning of the mirror 44, with its radius of curvature centred on the grating 42, is in contrast to prior art arrangements. Since the light at a given wavenumber passing from the grating 42 to the mirror 44 is collimated, prior art arrangements pay no attention to the relative positioning of these components.

The spectral image focused by the concave mirror 44 occupies a curved locus. If the radius of curvature of the mirror 44 (i.e. the distance between the grating 42 and the mirror 44) is denoted by R, then this curved locus is located at a distance R/2 midway between the grating 42 and the mirror 44, and has a radius of curvature R/2, also centred on the grating 42.

Alternatively, a paraboloid could be used for the mirror 44. This would trade-off bandwidth for improved discrimination of low wavenumbers (close to the laser line). In this case, the reciprocal of its curvature would be equal to the radius of curvature R used with a spherical mirror.

The transfer mirror 34 is placed in the curved locus at which the spectral image is focused. The transfer mirror is preferably a convex spherical or cylindrical mirror having a radius of curvature R/2, again centred on the grating 42, so as to coincide with the locus of the spectral image. Because of this coincidence, aberrations are minimised. The mirror 34 has the right convex curvature to direct the reflected light correctly into the second dispersive stage (FIG. 3). However, it is possible to use a plane mirror; aberrations are then not as well corrected and it may in consequence be necessary to restrict the bandwidth of the filter.

It was mentioned above that the transfer mirror 34 is located between the upper and lower levels seen in FIG. 1. In order that the spectral image is directed to the mirror 34, the concave focusing mirror 44 is tilted off-axis upwards by a couple of degrees, out of the plane of FIG. 2.

It will be remembered that the mirror 40 was tilted by the same amount but in a plane perpendicular to the tilting of the mirror 44. That tilting of the mirror 40 introduced a small amount of astigmatism, but this astigmatism is largely corrected by the perpendicular tilting of the mirror 44.

The convex transfer mirror 34 reflects the desired spectral image into the upper level of the optical filter 24, which is seen in FIG. 3. The upper level comprises similar components to those found in the lower level, in an entirely symmetrical arrangement. To avoid the need to repeat their description, the corresponding components have been given the same reference numerals as in FIG. 2, but with the suffix A. Thus, in the upper level the light travels in the opposite sense to the lower level, and the dispersed spectrum is recombined subtractively by a diffraction grating 42A, giving a polychromatic light beam which is output via an (optional) exit slit 38A and the mirrors 32,26 to the spectrograph 28.

The concave mirrors 44,44A and the convex transfer mirror 34 are arranged such that the gratings 42,42A are imaged onto one another—i.e. diverging light from a single point on one grating would be brought to the corresponding point on the other.

It is not essential for the second dispersive stage (FIG. 3) to be symmetrical to the first stage (FIG. 2). For example, the condition about positioning the mirror 44A so that its radius of curvature R is centred on the grating 42A could be ignored. However, this would require the grating 42A to be larger, with the spectrum spread out on it to an extent.

The diffraction grating 42A is rotatable on the axis 43 in tandem with the diffraction grating 42. Indeed, rather than two separate diffraction gratings, a single diffraction grating may be used which extends vertically between the lower and upper levels.

The transfer mirror 34 is located within the curved locus of the focused spectral image in such a way that only desired Raman light impinges upon it and is reflected towards the concave mirror 44A in the upper level (FIG. 3). Thus, as seen in FIG. 2, it is arranged that Rayleigh scattered light at 46 does not impinge upon the mirror 34, and is rejected. Fine tuning, such that Raman scattered light with low wavenumbers (i.e. close to the Rayleigh line) is reflected by the mirror 34 whilst the Rayleigh scattered light 46 still misses the mirror 34 and is rejected, could be carried out by adjustment of the position of the mirror 34 within the locus of the focused spectral image. However, it is more easily achieved by rotating the gratings 42,42A about the axis 43.

Coarse tuning can also be performed by rotating the gratings 42,42A, for example if a different laser wavelength is to be used.

Any desired transmission characteristic for the optical filter 24 can be achieved by an appropriately designed transfer mirror 34. For example, a wide or a narrow acceptance band can be achieved by providing a mirror 34 of a corresponding width. With the configuration shown in the drawings, the mirror 34 accepts only Raman scattered light on the Stokes side of the Rayleigh line. It will be appreciated that anti-Stokes Raman scattering could be accepted instead, by positioning the mirror 34 on the opposite side of the Rayleigh rays 46. Both Stokes and anti-Stokes scattering could be accepted by providing a transfer mirror 34 which has a narrow central slit, the slit being arranged to coincide with (and therefore reject) the Rayleigh rays 46.

In an alternative embodiment, the filter 24 could be re-oriented at 90°, compared to the configuration shown in FIG. 1, so that the view of FIG. 1 would now include that of FIG. 2, upside down. That is, what was the upper level (FIG. 3) is now located behind the components shown in FIG. 2. The mirrors 22,26,30,32 are re-oriented appropriately. When incorporated with the spectrograph of EP 543578, this alternative ensures that the gratings 42,42A agree with that in the spectrograph in terms of polarisation.

In order to provide a sharp transition between the rejection of the unwanted Rayleigh rays 46, and the reflection of desired Raman wavenumbers which are very close to the Rayleigh line, the edge of the mirror 34 which is closest to the Rayleigh rays 46 should desirably be a perfect edge, as straight and well defined as possible, and with an optically correct form to within less than a wavelength of the edge. It should also be acutely angled towards the rear surface of the mirror, so that the edge of the mirror cannot be seen from in front. This ensures that the intense Rayleigh scattered light is not reflected from the edge as unwanted stray light.

We therefore prefer to manufacture the mirror 34 as follows. This method is novel in its own right, and may be used to manufacture mirrors for other purposes than that described here.

The mirror 34 is manufactured from a suitable reflective single crystal material, such as silicon or another semiconductor. Its surface is ground and/or polished with the desired planar, spherical or cylindrical reflective profile. Subsequently, the straight, well-defined edge is produced by cleaving the crystal cleanly. To enable this, the reflective surface needs to be produced in appropriate alignment with a selected cleavage plane of the single crystal. No polishing of the mirror takes place after cleavage, since this could damage the well-defined edge produced by cleaving, and conventional optical polishing processes would cause a loss of the optical form over a fraction of a millimetre from the edge.

By way of example, we have successfully produced a mirror 34 using 111 oriented gallium arsenide (GaAs). The required sharp edge is produced by cleaving on the 110 cleavage plane. This method is illustrated in FIG. 5, where the reflective surface of the crystal is indicated at 60. Cleavage on the plane indicated by the line 62 produces a sharp edge 63. Arrow 46 indicates the Rayleigh rays which are to be rejected in use. Arrows 64 indicate Raman scattered light which is to be reflected.

With the arrangement described so far, we have successfully viewed Raman spectra to within 15 cm$^{-1}$ of the Rayleigh line. The filter nevertheless has a broad bandwidth. The bandwidth is not traded against aberrations, as in the prior proposals discussed in the introduction.

Figure 6:
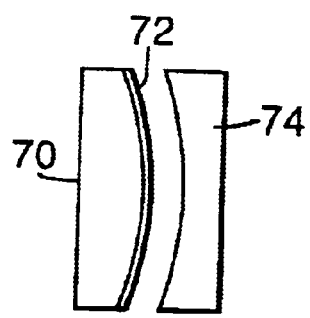
Figure 7:
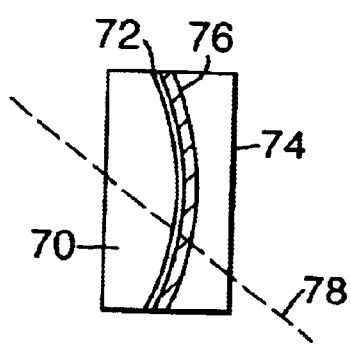
Figure 8:
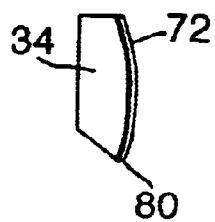

FIGS. 6 to 8 show another way to make the mirror 34. A plano-convex lens 70 is coated with an aluminium layer 72 to form a mirror surface. A mating plano-concave lens 74 is then temporarily bonded to the lens 70 using a wax layer 76. Next, the bonded lenses are cut on the line 78. During this process, the plano-concave lens supports the mirror surface 72, ensuring a clean cut. Finally, the wax is removed, and all lens parts are discarded except for the mirror component 34 seen in FIG. 8. After cleaning, this has the mirror layer 72 with the well-defined edge 80.

FIG. 4 shows a modification of the apparatus in FIGS. 1 to 3, which enables Raman spectra to be viewed as low as 5 cm$^{-1}$ or 10 cm$^{-1}$ from the Rayleigh line. FIG. 4 shows the diffraction grating 42, as in FIG. 2, with the collimated input beam from the concave mirror 40 designated as 48. However, whereas in FIG. 2 the grating 42 is rotated to an angle such that the diffracted spectrum is directed towards the concave mirror 44, in FIG. 4 it is instead rotated so that the diffracted spectrum is incident upon a fixed, plane mirror 50. The mirror 50 then reflects the dispersed spectrum back to the grating 42, where it is dispersed further, as shown at 52. The dispersed spectrum 52 is directed towards the mirror 44 as previously, but has double the dispersion compared with FIG. 2. As a result, there is double the resolution in the spectral image formed on the mirror 34, enabling greater resolution between the Rayleigh rays 46 and the desired low Raman wavenumbers reflected back to the mirror 44A and on to the spectrograph 28.

It will be appreciated that the arrangement of FIG. 4 is repeated in respect of the grating 42A in the upper level (FIG. 3). The fixed mirror 50 could be duplicated in the upper level, or a single mirror extending vertically across both upper and lower levels could be used.

The FIG. 4 arrangement introduces aberrations in those parts of the spectrum which are not close to the laser line. For this reason, we prefer to use it only when studying Raman lines at very low wavenumbers. For work at higher wavenumbers, the gratings are rotated back to their normal positions, in which the spectrum is dispersed directly towards the concave mirror 44.

In place of the transfer mirror 34, it would be possible to have a transfer aperture. Since the desired spectrum is now transmitted through the aperture rather than reflected by the transfer mirror 34, it will be appreciated that either the lower level (FIG. 2) or the upper level (FIG. 3) will need to be a mirror image of the arrangement shown in those respective figures. For example, in FIG. 3, the concave mirror 44A could be arranged on the left-hand side in order to collect the light passing through the transfer aperture, and to direct it to a diffraction grating 42A on the right-hand side of the figure.

A field lens (preferably with negative power) should be placed in or close to such a transfer aperture. Alternatively, the field lens could comprise multiple elements, arranged symmetrically nearer the mirrors 44,44A. If the field lens has positive power, the gratings can be moved nearer to the mirrors 44,44A (to ensure that the gratings are still imaged onto one another) but the focal locus becomes more curved (concave towards the positive lens elements).

In any such arrangement with a transfer aperture instead of the transfer mirror 34, of course, the mirrors 44,44A should still have a radius of curvature R centred on their respective gratings 42,42A, and the transfer aperture should still be arranged at the location R/2 as shown in FIG. 2.

Another possibility effectively combines a transfer aperture with the mirror 34, in an arrangement which is otherwise similar to FIGS. 2 and 3. A further mirror is provided, as one edge of a quasi-aperture, which reflects the laser wavelength out of the system. This is located in the focal locus of the grating 42 and mirror 44. It may be manufactured as discussed above, to give a good edge. The mirror 34 is located a few tens or hundreds of microns behind this further mirror, acting as a negative field optic and reflecting the desired Raman wavelengths to the mirror 44A. The aberration induced by moving the transfer mirror back slightly is negligible.

What is claimed is:

1. An optical filter comprising:

a first dispersive stage, a second dispersive stage, each dispersive stage comprising a dispersing element and focusing element, and having a predetermined focal locus for dispersed light, a transfer arrangement comprising a transfer mirror or aperture and configured with a transfer locus so as to image the dispersing elements of the first and second dispersive stages onto each other, light from the dispersing element in the first dispersive stage being focused by the focusing element of the first dispersive stage to produce a spectral image in the focal locus of the first dispersive stage, the transfer mirror or aperture being located in said focal locus, light of said spectral image which falls upon the transfer mirror or aperture being accepted and passed to the second dispersive stage, and light of said spectral image which does not fall upon the transfer mirror or aperture being rejected, light from a spectral image in the predetermined focal locus of the second dispersive stage being recombined subtractively by the focusing element and dispersing element thereof into a polychromatic beam, wherein the predetermined focal loci of the first and second stages and the transfer locus are continuously coincident with each other and the transfer mirror having a continuous reflective profile.

2. An optical filter comprising:

a first dispersive stage, a second dispersive stage, a curved transfer mirror between the first and second dispersive stages, each dispersive stage comprising a dispersing element and a concave mirror, light from the dispersing element in the first dispersive stage being focused by the concave mirror of the first dispersive stage, producing a spectral image in a predetermined locus, the transfer mirror being located in said locus, light of said spectral image which falls upon the transfer mirror being accepted and light of said spectral image which does not fall upon the transfer mirror being rejected, the concave mirror of the second dispersive stage receiving the light which is accepted by the transfer mirror and passing that light to the dispersing element of the second dispersive stage, wherein the concave mirror in at least one of said dispersive stages has a focusing radius of curvature which is centered on the dispersing element of that dispersive stage, and the transfer mirror also has a transfering radius of curvature which is centered on that dispersing element.

3. A filter according to claim 1, wherein the dispersing elements are diffraction gratings.

4. A filter according to claim 1, wherein the transfer arrangement comprises a field optic to image the dispersing elements onto one another by a field optic.

5. A filter according to claim 4, wherein said transfer mirror forms the field optic and has a non-planar surface forming the transfer locus.

6. A filter according to claim 1, wherein the transfer arrangement comprises a mirror which is convex to coincide with the focal locus of the focus of the spectral image.

7. A filter according to claim 1, wherein the focusing element in each dispersive stage is a concave mirror and has a radius of curvature which is centered on the dispersing element of the respective stage.

8. A filter according to claim 1, wherein the transfer arrangement comprises a mirror which has a well-defined edge produced by cleaving a single crystal material.

9. A spectroscopic system, incorporating a filter according to claim 1.

10. A filter according to claim 2, wherein the dispersing elements are diffraction gratings.

11. A filter according to claim 2, wherein the dispersing elements are imaged upon one another.

12. A filter according to claim 11, wherein the dispersing elements are imaged upon one another by a field optic.

13. A filter according to claim 12, wherein said transfer mirror is non-planar and forms the field optic.

14. A filter according to claim 2, wherein the transfer mirror is convex to coincide with the locus of the focus of the spectral image.

15. A filter according to claim 2, wherein the concave mirror in each dispersive stage has a focusing radius of curvature which is centered on the dispersing element of the respective stage.

16. A filter according to claim 2, wherein the transfer mirror has a well-defined edge produced by cleaving a single crystal material.

17. A spectroscopic system, incorporating a filter according to claim 2.

18. An optical filter according to claim 2, wherein the transferring radius of curvature of the transfer mirror is half the focusing radius of curvature of the concave mirror in said at least one dispersive stage.

19. An optical filter according to claim 7, wherein the transfer arrangement comprises a transfer mirror having a transferring radius of curvature centered on said dispersing elements.

20. An optical filter according to claim 19, wherein the transfering radius of curvature of the transfer mirror is half a focusing radius of curvature of the concave mirror in at least one of the dispersive stages.

* * * * *